(12) United States Patent
Storbeck et al.

(10) Patent No.: US 6,817,567 B2
(45) Date of Patent: Nov. 16, 2004

(54) ADHESIVE TAPE

(75) Inventors: Reinhard Storbeck, Hamburg (DE); Markus Eikmeier, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/728,839

(22) Filed: Dec. 1, 2000

(65) Prior Publication Data

US 2001/0003617 A1 Jun. 14, 2001

(30) Foreign Application Priority Data

Dec. 2, 1999 (DE) .................................... 199 58 223

(51) Int. Cl.⁷ ............................. B65H 19/18; B32B 7/12
(52) U.S. Cl. .................... 242/556.1; 242/556; 428/343; 428/354; 428/40.1; 156/304.1
(58) Field of Search ............................. 242/556.1, 556; 428/343, 354, 40.1; 156/304.1

(56) References Cited

U.S. PATENT DOCUMENTS

| | | | |
|---|---|---|---|
| 5,212,002 A | * 5/1993 | Madrzak et al. | 428/40 |
| 5,692,699 A | * 12/1997 | Weirauch et al. | 242/556.1 |
| 5,702,555 A | * 12/1997 | Caudal et al. | 156/247 |
| 5,901,919 A | * 5/1999 | Wienberg | 242/556.1 |
| 5,916,651 A | * 6/1999 | Wienberg et al. | 428/40.1 |
| 6,595,461 B1 | * 7/2003 | Storbeck et al. | 242/556.1 |

FOREIGN PATENT DOCUMENTS

| | | | |
|---|---|---|---|
| DE | 40 33 900 | 10/1991 | .......... B65H/19/18 |
| DE | 196 28 37 A1 | 1/1998 | ............. C09J/7/04 |
| DE | 196 28 317 | 1/1998 | ............. C09J/7/04 |
| DE | 196 32 689 | 2/1998 | ............. C09J/7/04 |
| EP | 0 418 527 | 3/1991 | .......... B65H/19/18 |
| EP | 1 022 245 A2 | 7/2000 | .......... B65H/19/10 |

OTHER PUBLICATIONS

EP 418527 A Patent Abst, Mar. 1991.*
Handbook of Adhesive, 2nd Ed (1977) Ch. 47 "Pressure Sensitive Tapes and Labels", p 724–734.*
U.S. patent application Ser. No. 09/490,709, filed Jan. 24, 2000.

* cited by examiner

*Primary Examiner*—Daniel Zirker
(74) *Attorney, Agent, or Firm*—Norris McLaughlin & Marcus

(57) ABSTRACT

Adhesive tape with adhesive front side and nonadhesive rear side and two long edges for flying reel change, having
  a) a film backing (P1), which is coated on one side—the front side—with a self-adhesive composition (N1),
  b) part of the nonadhesive rear side of the film backing (P1) being equipped with a double-sided adhesive tape (DO) which has, on one side, a cleavable system (P2) coated on both sides with self-adhesive composition (N2, N3), wherein
  c) the double-sided adhesive tape (DO) is arranged at a distance (V) of 0–15 mm, especially 0.5 to 15 mm, from one long edge (LK) of the adhesive tape.

16 Claims, 1 Drawing Sheet

ADHESIVE TAPE

The invention relates to an adhesive tape for flying splice (flying reel change) and to a splice method using such an adhesive tape, especially in paper-converting machines, printing machines and the like.

BACKGROUND OF THE INVENTION

Flying splice in papermills, film-producing plants or the like is a common technique for replacing an old, almost fully unwound roll of paper by a new roll without having to stop the machines, with run at high speed. This is done using double-sided self-adhesive tapes, so-called tabs, which possess high adhesion and high tack. These tabs are bonded artistically in a zigzag form to the beginning of the web, a procedure requiring experienced personnel, with only about 4–5 minutes' time remaining for the entire procedure, owing to the high speed of the machines.

Although this technology is well established, it is not without certain disadvantages. Thus, experienced personnel are required, the procedure is intrinsically hectic, and the bonds are also relatively thick, since in each case two plies of web and the adhesive tab in between are the result: a result which is unwanted in the industry.

There are various products on the market, known as splicing tapes, for this "butt splicing" in flying splice, which are coated on both sides with pressure-sensitive adhesive composition. Adhesive tapes of this kind are marketed, inter alia, under the name tesafix (Beiersdorf).

The prior art describes diverse adhesive tapes for such purposes. For instance, EP 418 527 A2 discloses a method of preparing a reel of printing material in web form for automatic reel changers and an adhesive strip suitable for this purpose. DE 40 33 900 A1 also describes an adhesive tape suitable for a splice point. A disadvantage, however, are adhesive regions which lie exposed after the splice method has been implemented.

The nonadhesive masking of otherwise exposed adhesive areas is taught by U.S. Pat. No. 5,702,555 for more static loadings while securing a reel start, while DE 196 32 689 A2 discloses an adhesive tape of this kind for dynamic loading during the splicing method, the paper backing of this tape cleaving and masking the adhesive compositions with its residues.

Also of this kind is an adhesive tape in accordance with DE 196 28 317 A1, likewise for a splicing method. This adhesive tape carries, on its nonadhesive reverse, a double-sided adhesive tape (6) which has a paper backing (7) which is suitable for splicing and which cleaves (7a, 7b, FIG. 3) during the splicing method and masks the respective adhesives. This double-sided adhesive tape (6) ends at the side with one side of the paper backing (2); it is, therefore, arranged along one of the long edges of the adhesive tape.

In practice, even these adhesive tapes exhibit disadvantages, primarily because a splice does not succeed but instead ends as a break, without any evident reason for this.

In particular, it was necessary to solve the problem of developing an adhesive tape with which carrier materials in web form which are under tension may be joined reliably to one another.

It is an object of the invention to provide a remedy here.

This object is achieved by means of an adhesive tape and splicing method as detailed in the claims. In order to avoid repetition, reference is made expressly to the claims, especially with regard to preferred embodiments.

In accordance with the invention, splices succeed without breaks, a preferred feature being the offset or distance V of the double-sided adhesive tape DO from the long edge LK of the adhesive tape.

SUMMARY OF THE INVENTION

In accordance with the invention, there are relevant advantages for practical use:

Tensile strength and elongation at break characteristics are much more readily controllable with film systems than in the case of paper backings. As a result it is possible to splice even those carrier systems which are highly sensitive to tearing. The products may be adapted steplessly to the carrier systems that are to be spliced.

Film systems exhibit no dimensional changes as a result of climatic conditions, and so the bales prepared for splicing can be stored for longer. Bale product spliced using paper systems must be supplied to the splicing operation immediately after preparation (dependent, of course, on the ambient climatic conditions).

Film systems are better suited to mechanical processing (i.e., automatic attachment of the splice) owing to increased tensile strength and improved flatness.

Coextruded polymeric composite systems may be produced in a defined manner in one operation, inexpensively and with few fluctuation parameters.

DETAILED DESCRIPTION

Cleaving Systems

The cleavable system advantageously has a markedly lower cleavage resistance than the principal carrier (P1) which has to accommodate the tensile forces. A sufficient difference is helpful for the functional principle of the product of the invention.

Suitable cleaving systems include, for example, the following papers or paper composite systems or polymeric composite systems:

Duplex papers: These papers are standard commercial products and are used, for example, in the production of filter materials and wallcoverings.

Readily cleaving papers: The cleavage work is adjusted by way of the consolidation of the paper fiber structure. The lower the consolidation, the lower the cleavage work.

Suitable paper types include, for example, machine-finished papers calendered on one side or else highly calendered kraft papers.

Sized paper systems or sized film systems: The cleavage work is adjusted by way of the chemistry of the pressure-sensitive adhesive or of the coating system. The sizing or pressure-sensitive adhesive should have penetrated into the paper only to an insignificant extent.

Coextruded polymeric composite systems: Extruded multilayer systems with low bond strength between the boundary layers.

Polymer nonwovens: The cleavage work is adjusted by way of the chemistry of the fixatives.

Clean cut edges are also helpful for the objectives of the present invention. During the cutting operation, no composition should be squeezed out. In particular, the cleavable attachment area of the cleaving material should not be covered by a pressure-sensitive adhesive composition.

The amount by which the cleavable material is set back, or the distance V, should in accordance with the invention be 0–15 mm, especially 0.5–15 mm, especially 1–7 mm, and very particularly 1.5 mm–3.5 mm.

Suitable cleaving paper comprises a variety of cleavable paper systems, such as

Duplex papers (papers laminated together in a defined manner); the process of cleavage proceeds extremely homogeneously, no stress peaks are produced as a result, for example, of inhomogeneous consolidation. These papers are used for the production of wallcoverings and filters.

Readily cleavable paper systems

Highly consolidated papers sized together in a defined way (→ paper with a high cleavage strength). Sizing may be carried out, for example, using starch, starch-containing derivatives, wallpaper adhesives based on methyl cellulose (Methylan®, Henkel KGaA, Dusseldorf, Germany) or else based on polyvinyl alcohol derivatives.

The width of the cleaving system is preferably 3–35 mm, especially 6–12 mm.

Suitable self-adhesive compositions include all typical pressure-sensitive adhesive compositions, especially Acrylates (water-soluble and water-insoluble)

Natural rubber compositions, synthetic rubber compositions

The splicing method, in this case the bonding operation using the splicing tape, may in particular take place in such a way that the adhesive tape is bonded to the running web at right angles (disadvantage: the cleavable system must cleave completely within fractions of seconds) but also at an acute angle (advantage: the process of cleavage runs as a wave through the adhesive tape), in particular up to 45°, especially up to 15°.

BRIEF DESCRIPTION OF THE DRAWING

The drawing shows a diagram of an adhesive tape of the invention in cross section and is therefore intended to illustrate the invention by way of example. The reference symbols are explained in the claims.

TEST METHODS

Figure 1:
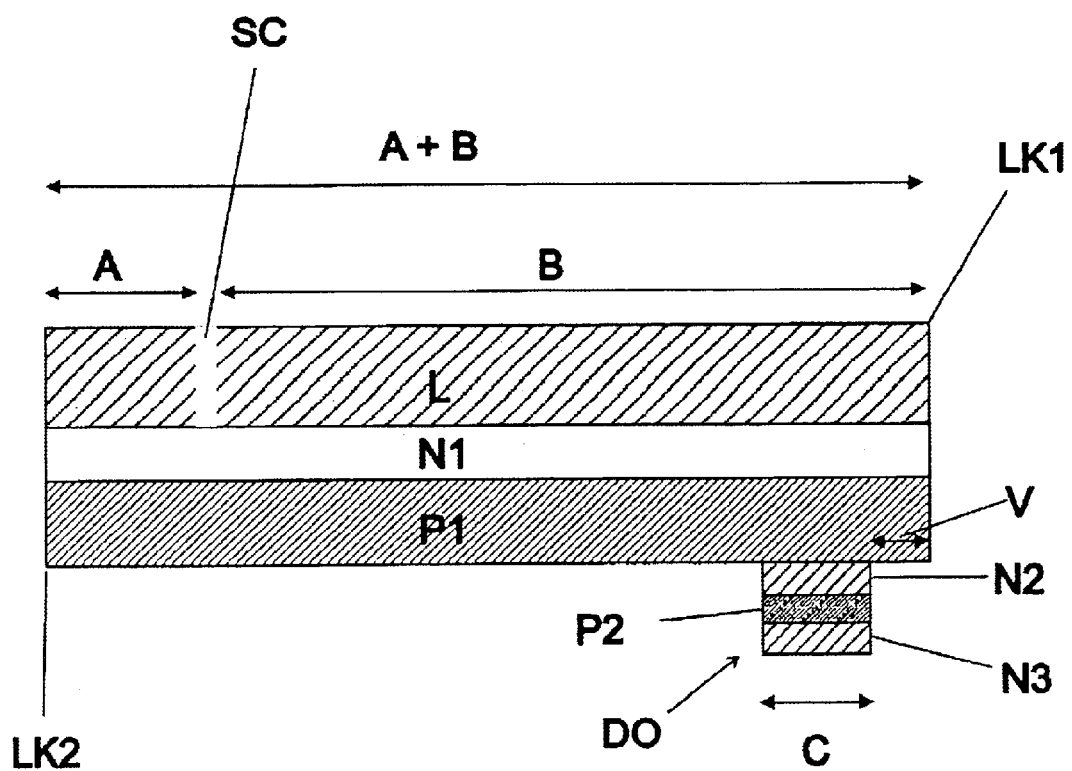

Measuring the cleavage strength (internal bond strength) of papers or other composite systems Purpose and Scope of Application Testing the strength of paper or other materials built up from fibers in the z direction, or composite systems. The cleavage strength is determined. The cleavage strength is the force which has to be overcome in order to cleave a test element in the z direction.

Principle of the Method

Two adhesive tapes are applied to the system to be tested, located opposite each other, and are pulled apart at an angle of 180° in the tensile testing machine. The force to be overcome in order to cleave the system is the cleavage strength.

Instruments and Atmospheric Testing Conditions

Tensile testing machine
Blade or strip cutter 15 mm wide
Hand-held roller 2 kg
Atmospheric testing conditions: 23+/–1° C., 50+/–5% relative humidity Materials Adhesive tape such as testband 7475
Width 20 mm, strips about 20 cm long Test Samples DIN A4 sheets The samples must be conditioned for at least 16 hours under standard atmospheric conditions.

Test Procedure

Two adhesive tapes are placed on the system to be tested from both sides, located opposite each other, and are smoothed lightly with the finger in order to avoid air inclusions.

The hand-held roller is then used to roll the composite twice on both sides, in order to achieve a satisfactory bond strength. The bond is to be produced in such a way that, on one side, the ends of the adhesive tape project beyond the test element and, by being folded, can be stuck to each other to form a grip.

The testing direction may be the running direction or transverse to the running direction of the test element, depending on the aim of the test.

Using a steel rule, strips of a length of about 20 cm and 15 mm in width are cut centrally from the composite. The two grips of the projecting adhesive tape are then pulled apart by hand until cleavage of the test specimen can be detected. The test element is then clamped into the tensile testing machine by the grips, freely suspended at the top and the bottom, and the rest of the strip is pulled apart at a constant speed of 300 mm/min.

In the case of very thin systems, care should be taken that the result is not falsified by the fact that the opposite edges of the adhesive tape have contact with the edge of the test element and stick to it.

Evaluation and Assessment

The cleavage strength of the test element is specified in cN/cm.

The average of 5 values determined is specified.

Application Examples

The following examples describe trial products tried out for flying reel change, the splicing conditions and the splicing results. The product constructions tried are illustrated in Table 1.

The drawing describes the associated product construction.

Description of the Systems Used

The following coating base papers and polymer films were used for the splicing trials:

[A] Coating base paper (grammage 134 g/m$^2$, thickness 167 μm) e.g.: Sappi Alfeld AG, 31061 Alfeld

[B] MOPP film (grammage 45 g/m$^2$, thickness 50 μm) e.g.: Nowofol Kunststoffprodukte GmbH & Co KG, 83313 Siegsdorf

[C] BOPP film Trespaphan GND 50 (grammage 44 g/m$^2$, thickness 50 μm) e.g.: Hoechst AG, Frankfurt The following cleaving systems were used for the trial products:

[D] Duplex filter paper

Grammage 51 g/m$^2$, thickness 90 μm

Cleavage work, transverse 34–44 cN/cm

[E] Machine-finished paper calendered on one side
Grammage 57 g/m², thickness 74 μm
Cleavage work, transverse 33–38 cN/cm

[F] Sized paper composite system with defined cleavage work.
Two machine-calendered base papers are bonded together using a size containing starch. Grammage in each case 54 g/m², thickness 66 μm. The transverse cleavage work of the composite is 28–32 cN/cm.

[G] Coextruded film composite system with defined cleavage work.
A two-layer system is produced by coextrusion. The transverse cleavage work of the composite is 30–35 cN/cm.

The following backing sheets were used for the trial products:

[H] BOPP film
Grammage 44 g/m², thickness 50 μm, ultimate transverse tensile strength≧190 N/15 mm

[I] PET film
Grammage 70 g/m², thickness 50 μm, ultimate transverse tensile strength 120–225 N/15 mm

[J] Aluminized PET film
Grammage 35 g/m², thickness 25 μm, ultimate transverse tensile strength 78 N/15 mm

[K] Aluminum foil
Grammage 216 g/m², thickness 80 μm, ultimate transverse tensile strength 72–135 N/15 mm

TABLE 1

Summary of the technical data of the trial products and trial parameters used

| Trial parameters | Unit | Drawing | Example 1 | Example 2 | Example 3 | Example 4 | Example 5 | Example 6 | Example 7 | Example 8 | Example 9 |
|---|---|---|---|---|---|---|---|---|---|---|---|
| Width A + B | mm | A + B | 85 | 85 | 85 | 85 | 85 | 85 | 50 | 50 | 50 |
| Width A | mm | A | 30 | 30 | 30 | 30 | 30 | 30 | 12 | 12 | 12 |
| Width B | mm | B | 55 | 55 | 55 | 55 | 55 | 55 | 38 | 38 | 38 |
| Width C | mm | C | 35 | 30 | 12 | 12 | 9 | 9 | 6 | 9 | 9 |
| Thickness of release material 1) | μm | L | 90 | 90 | 90 | 90 | 90 | 90 | 90 | 90 | 90 |
| Release material pull-off force 2) | cN/cm | L | 4 | 4 | 4 | 4 | 4 | 4 | 4 | 4 | 4 |
| Amount applied to backing sheet 3) | g/m² | N 1 | 55 | 50 | 50 | 50 | 45 | 50 | 45 | 45 | 45 |
| Type of backing sheet (type) | | P 1 | H | H | I | I | I | J | J | K | K |
| Thickness of backing sheet (BS) 1) | μm | P 1 | 50 | 50 | 50 | 50 | 50 | 25 | 25 | 80 | 80 |
| Ultimate transverse tensile force (BS) 4) | N/15 mm | P 1 | ≧190 | ≧190 | 120–225 | 120–225 | 120–225 | 78 | 78 | 72–135 | 72–135 |
| Amount applied to cleaving system 3) | g/m² | N 2 | 27 | 27 | 27 | 27 | 27 | 27 | 27 | 27 | 27 |
| Type of cleaving system (type) | | P 2 | G | D | D | D | F | E | D | G | D |
| Cleavage strength of cleaving system 5) | cN/cm | P 2 | 30–35 | 34–44 | 34–44 | 34–44 | 28–32 | 33–38 | 34–44 | 30–35 | 34–44 |
| Amount applied to cleaving system 3) | g/m² | N 3 | 27 | 27 | 27 | 27 | 27 | 27 | 27 | 27 | 27 |
| Offset | mm | V | 1.5 | 0 | 2 | 1.5 | 2 | 2.0 | 1.5 | 0 | 1.5 |
| Parameters of splicing trials | | | | | | | | | | | |
| System (type) to be spliced | | | A | B | C | B | A | A | C | A | C |
| Web speed | m/min | | 1300 | 1100 | 1250 | 1200 | 750 | 1200 | 1200 | 650 | 480 |
| Splicing angle 6) | ° | | 5 | 5 | 5 | 45 | 0 | 0 | 15 | 0 | 5 |
| Working width | cm | | 100 | 100 | 100 | 100 | 100 | 100 | 100 | 150 | 150 |
| Results of the splicing trials | | | | | | | | | | | |
| Splicing successful | | | X | | X | X | X | X | X | X | X |
| Splicing failed | | | | X | | | | | | | |

1) Thickness to DIN EN 20534, d = 16 mm, 20 N
2) Pull-off force to FINAT FTM 3
3) Amount applied of adhesive composition to FINAT FTM 12
4) Ultimate tensile strength to DIN EN ISO 1924.2 (300 mm/min, 100 mm clamped length)
5) Cleavage strength measurement method as described in text
6) Splicing angle: right angles (= 0°) to approximately a right angle (= max 15°) to the running paper web.

What is claimed is:

1. An adhesive tape with adhesive front side and nonadhesive rear side and two long edges for flying reel change, having
   a) a film backing (P1) having a front side and a rear side and which is coated on the front side with a self-adhesive composition (N1),
   b) part of the nonadhesive rear side of the film backing (P1) being equipped with a double-sided adhesive tape (DO) which is comprised of a cleavable system (P2) coated on both sides with self-adhesive composition (N2, N3), wherein
   c) the double-sided adhesive tape (DO) is arranged at a distance (V) of 0.5–15 mm, from one long edge (LK) of the adhesive tape.

2. The adhesive tape as claimed in claim 1, wherein the distance (V) is 1–7 mm.

3. The adhesive tape as claimed in claim 2, wherein the distance (V) is 1.5 to 3.5 mm.

4. The adhesive tape as claimed in claim 1, wherein the self-adhesive compositions (N1, N2, N3) are pressure-sensitive adhesive compositions based on acrylates or rubber.

5. The adhesive tape as claimed in claim 1, wherein the self-adhesive compositions (N1, N2, N3) are water-soluble adhesive compositions based on acrylates.

6. The adhesive tape as claimed in claim 1, wherein the self-adhesive composition (N1) is masked with a release material (L).

7. The adhesive tape as claimed in claim 6, wherein the release material (L) is provided with a slit (SC).

8. The adhesive tape as claimed in claim 7, wherein the slit (SC) is arranged at a distance of 5 to 40 mm from that long edge (LK 2) of the adhesive tape which is opposite the long edge (LK1) close to which the double-sided adhesive tape (DO) is arranged.

9. The adhesive tape as claimed in claim 1, wherein the double-sided adhesive tape (DO) is 3 to 35 mm wide.

10. The adhesive tape of claim 9, wherein said double-sided adhesive tape is 6 to 12 mm wide.

11. The adhesive tape as claimed in claim 1, wherein the cleavage strength of the cleavable system (P2) is 20 to 70 cN/cm.

12. The adhesive tape of claim 11, wherein said cleavage strength is 22–60 cN/cm.

13. The adhesive tape of claim 12, wherein said cleavage strength is 25–50 cN/cm.

14. A splicing method, in which an adhesive tape as claimed in claim 1 is partly stuck behind the top paper or film web of a reel, while the double-sided adhesive tape on the rear side of the adhesive tape is stuck to the web beneath it and therefore secures the top web, firstly only part of the release material optionally located on the self-adhesive composition being pulled off, so that that part of the self-adhesive composition needed for the splicing method is still masked with release material and, in this state, the reel has no free adhesive area, after which, in order to prepare for the splicing method finally, any remaining release material still present is removed, whereupon the new reel equipped in this way is placed beside an old reel which has been almost completely unwound and is to be replaced, and is accelerated to the same rotary speed as said old reel and is then pressed against the old paper or film web, the exposed self-adhesive composition of the adhesive tape sticking to the old paper or film web at essentially equal speeds of the paper or film webs, while at the same time the cleavable system cleaves and, with its remains, nonadhesively masks both self-adhesive compositions which were coated on said system.

15. The splicing method as claimed in claim 14, wherein the adhesive tape is bonded to the running web at right angles or at an acute angle of up to 45°.

16. The splicing method of claim 15, wherein said adhesive tape is bonded to said running web at an acute angle of up to 15°.

* * * * *